2,933,394
PROCESS OF PREPARING A COFFEE PRODUCT

Frank J. Baume, San Francisco, Calif., assignor of fifty-one percent to Inks Bros., San Francisco, Calif., a partnership No Drawing. Application April 2, 1958
Serial No. 725,792

1 Claim. (Cl. 99—68)

This invention relates to a process of preparing a coffee product and to a novel coffee product.

Conventional preparations of coffee products such as roasted, ground, or powdered coffee usually result in some loss of the aromatic vapors from the coffee and in the change of the color of the coffee product from a clear greenish color to a brown color during roasting processes. It has been found that the color change resulting from roasting the coffee in the presence of air or other gaseous vapors of considerable quantity is caused by a chemical change of the product with a resulting loss of flavor.

It is therefore the primary object of the present invention to prepare a coffee product wherein no aromatic vapors are lost during the roasting and packing and in which the coffee does not lose any of its natural aroma and fragrance.

A further object of the invention resides in the process of preparing the coffee product wherein the coffee is not subjected to any chemical reaction but will remain a clear greenish color indicating that no chemical reaction has taken place.

A further object of the invention resides in the provision of a coffee product which is formed in discrete pieces which may be marked for breaking into desired portions of the coffee product and which may be simply added to water to form a beverage ready for consumption.

In carrying out the invention, coffee beans, as prepared and ready for packing and shipping on coffee plantations are fed to oscillating and forwardly moving conveyors, such as endless belts, screens or the like, wherein the coffee beans are inspected and visible impurities removed. Various types of coffee beans may be used and the coffee beans are now moved forward on various types of conveyors such as level running, belting, or rotating tubes to move the beans forward into a hot air current or to drop the beans vertically or blow them upward through a hot air space. This will serve to cause the beans to be blistered and scorched and the beans may be directed into multiple deflectors to thereby loosen and remove chaff. The partially heated beans are now moved forward on the endless belt of metal mesh or wire netting and are dropped into dissecting machines where the beans are sliced and broken (not crushed) into coarse particles, and then again conveyed forward by the employed means while under constant, dry, hot air current for the purpose of removing more chaff and moisture. The sliced and broken beans are then fed into a fine grinding and pulverizing machine, where they are reduced to a paste-like substance.

Then, the powdered coffee is solidly packed and compressed into suitable shapes such as tablets in the shape of cubes or the like and these pieces are impressed with markings indicating the sizes which should be broken off for portions as per cup of coffee to be prepared. The continuous hot air draft has blown off the chaff which causes the extra bitter taste of the coffee and the compressed coffee substance is now packed in suitable containers. These compressed pieces are filled into the containers which are preferably of a rectangular or other regular shape having a proper volume-thickness with respect to the compressed coffee pieces in order to get a uniform penetration of heat.

It is essential, in practicing this invention, that the above described slicing and breaking, the fine crushing, the compressing and packing operations take place in a controlled atmosphere in which the product is continuously subjected to hot, dry air currents so that no outside air comes in contact with the beans during these steps.

The compressed coffee product will permit substantially complete evacuation of the containers of any gases contained therein. The containers may be made of glass, metal, ceramics, or of any other suitable material and after evacuation thereof of air or other gases present, the containers are moved into a heating zone for toasting of the compressed coffee product. It has been found that this toasting in the absence of air and other gases will not result in the usual browning of the coffee product but that the coffee product will remain a greenish clear color and will remain in the cube or other shaped pieces to which the coffee product has been compressed. This roasting will bring out the highly desirable aroma and natural fragrance without any chemical reaction taking place and all of the aromatic vapors will remain in the containers since the container is sealed prior to the roasting.

The temperature of the zone of heat into which the containers are moved is approximately 375° and the containers remain in the zone of heat in order to achieve complete roasting which is of course dependent upon the size of the containers.

After the coffee product has been suitably roasted, it is moved out into the cooling, labeling and packaging machines.

All forward moving means utilized in the various steps of the process may be continuously oscillating and vibrating so as to assure the proper removal of impurities and foreign matter and assures a more homogeneous product.

As a result, a coffee product is produced within a container having discrete pieces of compressed powdered coffee roasted in the container with all the vapors and aromatics resulting from the roasting remaining in the container without causing any discoloration of the coffee product.

What is claimed as new is as follows:

The process of preparing coffee for beverages which comprises preliminarily subjecting green coffee beans to a hot gas stream sufficiently hot to scorch and blister the beans and to remove loosened chaff and skin from the beans, then dissecting the heated beans by slicing and breaking them, as distinguished from crushing them, into coarse particles, conveying the coarse particles through a hot air current sufficiently hot for drying the beans and sufficiently strong for removing chaff loosened by the slicing and breaking, subjecting the sliced and broken beans from which moisture has been removed to grinding and pulverizing, thus forming practically moisture free powder without chaff, compressing the powder into tablets and filling the tablets into containers, evacuating said containers; sealing said containers, subjecting the containers to the roasting temperature of approximately 375° F. and then cooling the containers.

References Cited in the file of this patent

UNITED STATES PATENTS

| | | |
|---|---|---|
| 1,496,932 | Gross | June 10, 1924 |
| 2,133,559 | Mushaben | Oct. 18, 1938 |